(12) United States Patent
Nishikawa

(10) Patent No.: US 6,912,642 B2
(45) Date of Patent: Jun. 28, 2005

(54) STORAGE SERVICE METHOD, STORAGE SERVICE USER TERMINAL DEVICE, STORAGE SERVICE PROVIDING DEVICE, AND STORAGE MEDIUM STORING STORAGE SERVICE PROGRAM

(75) Inventor: Katsuhiko Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 09/987,898

(22) Filed: Nov. 16, 2001

(65) Prior Publication Data

US 2002/0161980 A1 Oct. 31, 2002

(30) Foreign Application Priority Data

Apr. 27, 2001 (JP) ........................................ 2001-131143

(51) Int. Cl.$^7$ .............................................. G06F 12/00
(52) U.S. Cl. ........................................ 711/171; 711/162
(58) Field of Search ................................ 711/117, 118, 711/133, 161, 162, 171; 709/203, 204, 231, 232; 707/204

(56) References Cited

U.S. PATENT DOCUMENTS

| | | | | | |
|---|---|---|---|---|---|
| 5,309,451 | A | * | 5/1994 | Noya et al. .................. | 714/766 |
| 5,483,276 | A | * | 1/1996 | Brooks et al. ................ | 725/10 |
| 5,488,359 | A | * | 1/1996 | Faris et al. ................. | 340/7.52 |
| 5,551,002 | A | * | 8/1996 | Rosich et al. ............... | 711/134 |
| 6,381,613 | B1 | * | 4/2002 | Gallery et al. ............ | 707/104.1 |
| 6,553,468 | B1 | * | 4/2003 | Smith ......................... | 711/159 |
| 2002/0104097 | A1 | * | 8/2002 | Jerding et al. .............. | 725/115 |

* cited by examiner

*Primary Examiner*—Hiep T. Nguyen
(74) *Attorney, Agent, or Firm*—Staas & Halsey LLP.

(57) ABSTRACT

A storage service system includes a storage service user (SSU) which uses a data accumulation service, and a storage service provider (SSP) which provides a user terminal with a data accumulation area. The SSU monitors a free capacity of its own data accumulation unit such that the free capacity cannot be smaller than a predetermined value, and automatically transfers stored data to the SSP through a network when the free capacity becomes close to the predetermined value. Thus, the SSU can reserve a constant free capacity.

19 Claims, 16 Drawing Sheets

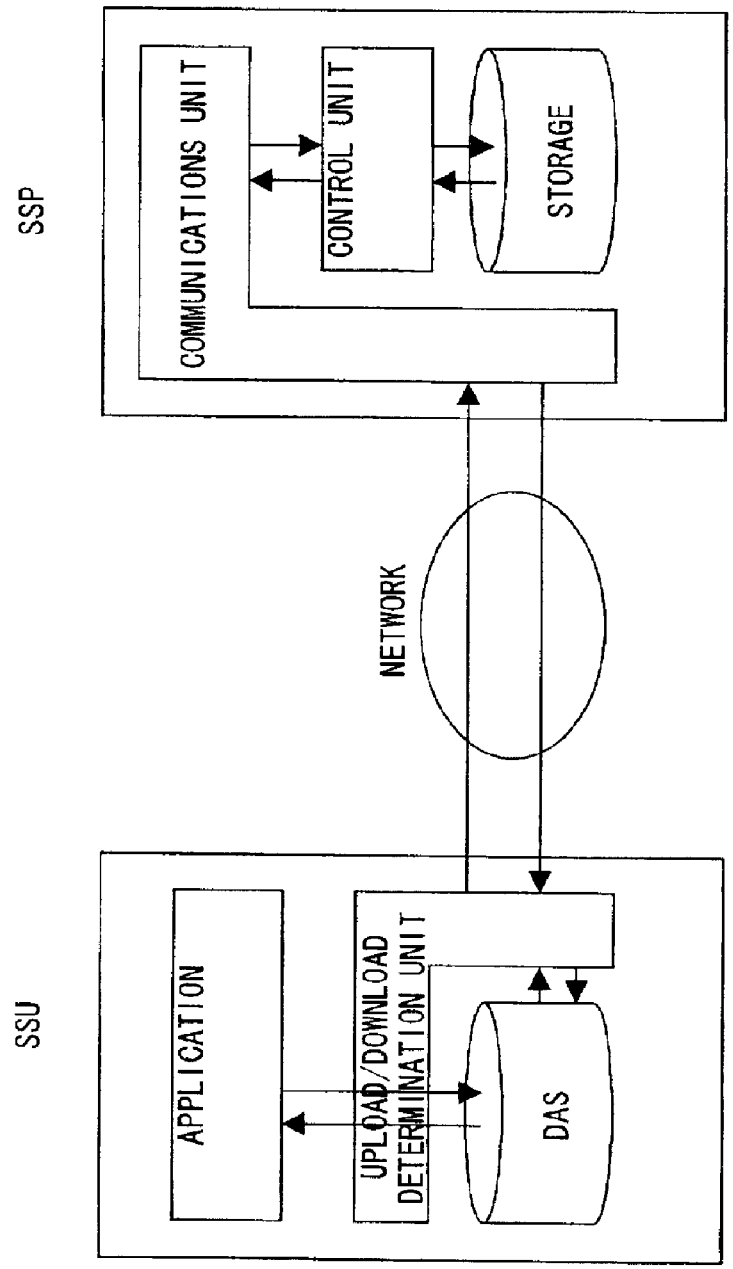
F I G. 1

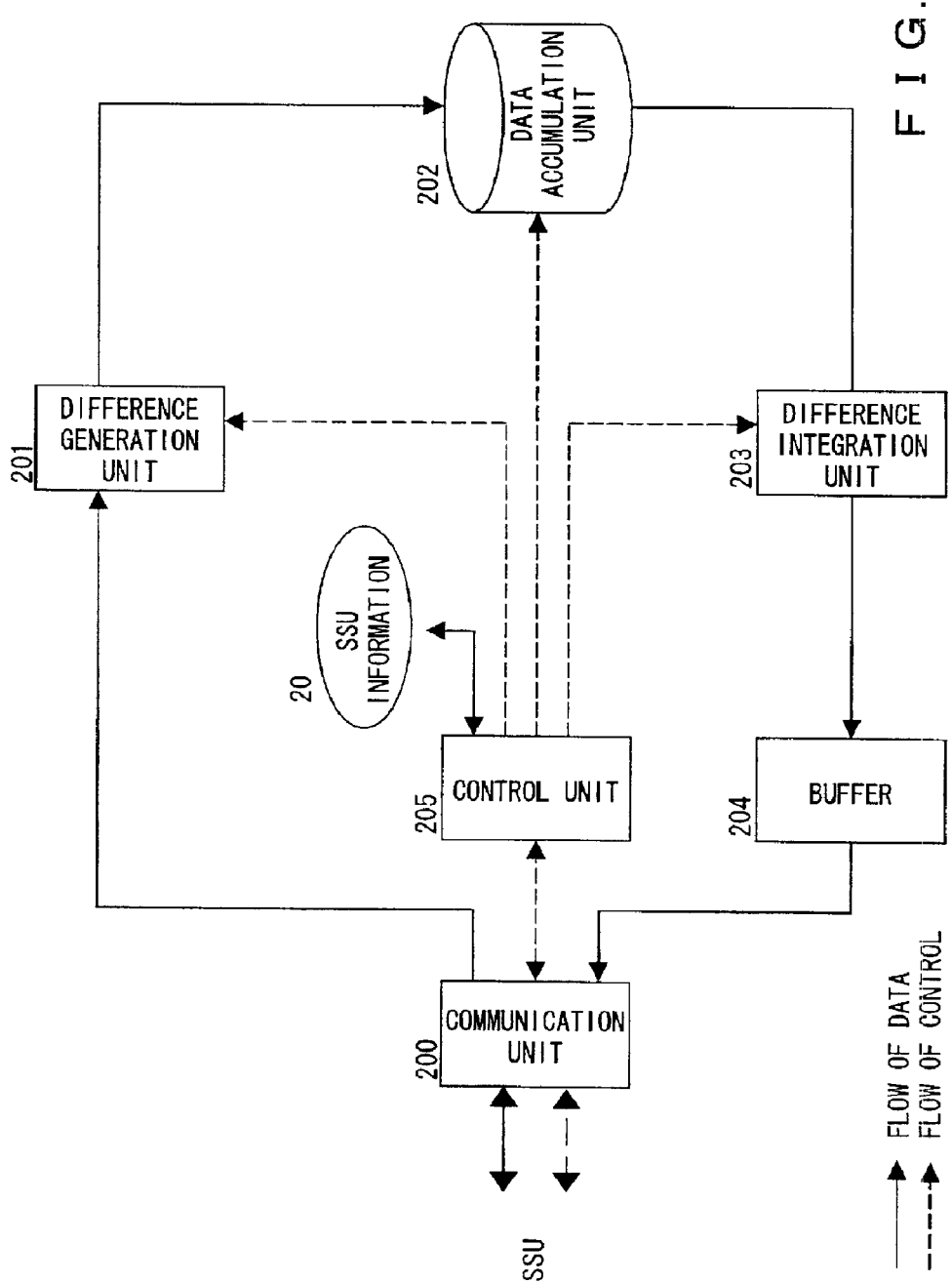

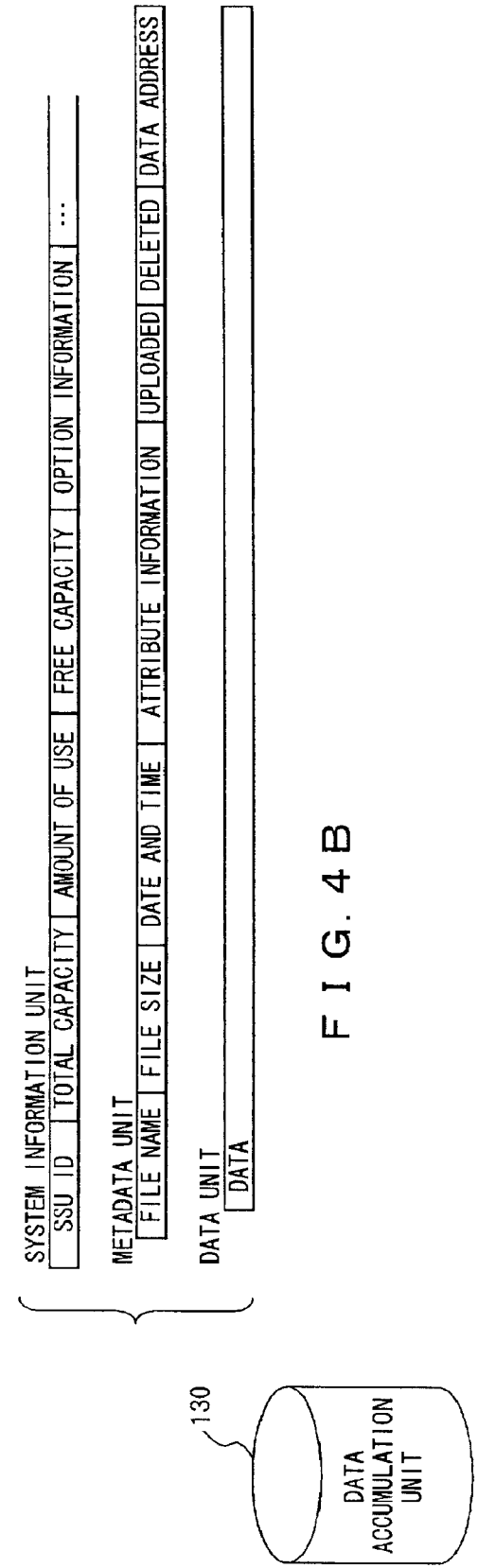

FIG. 5A
Upload Data Format: SEQ. # | SSU ID | COMMAND NAME [UPLOAD] | FILE NAME | FILE SIZE | DATE AND TIME | ATTRIBUTE INFORMATION | DATA

FIG. 5B
Execution Result Data Format: SEQ. # | COMMAND NAME [UPLOAD] | ERROR INFORMATION

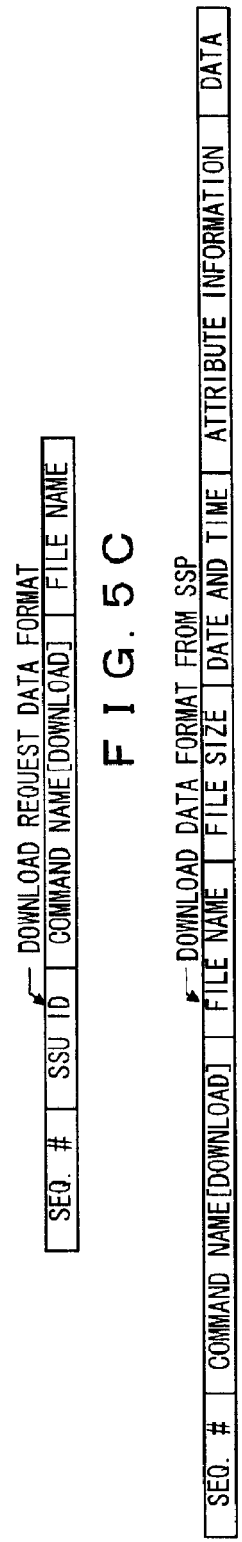

FIG. 5C
Download Request Data Format: SEQ. # | SSU ID | COMMAND NAME [DOWNLOAD] | FILE NAME FIG. 5D
Download Data Format from SSP: SEQ. # | COMMAND NAME [DOWNLOAD] | FILE NAME | FILE SIZE | DATE AND TIME | ATTRIBUTE INFORMATION | DATA

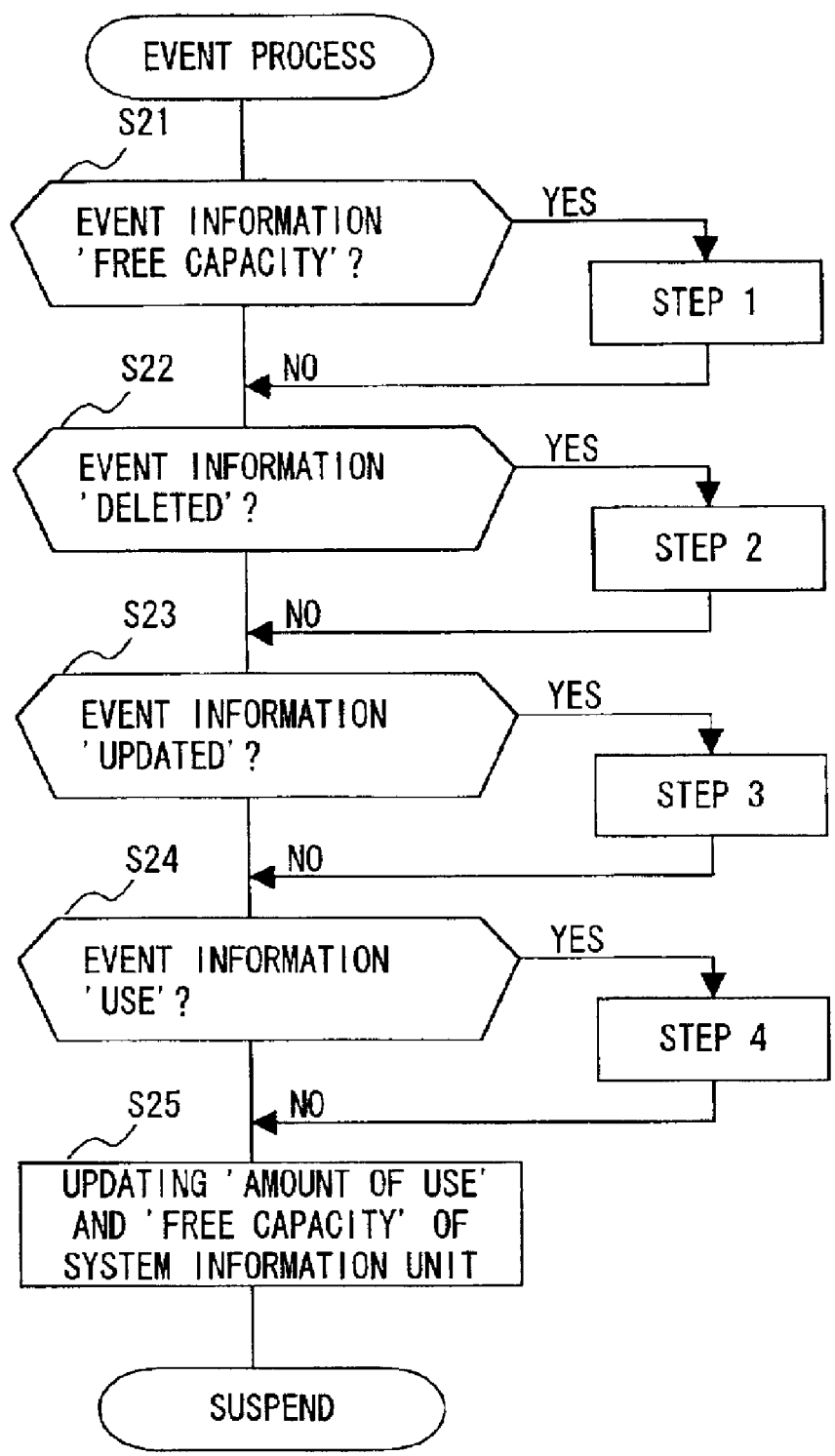
F I G. 7

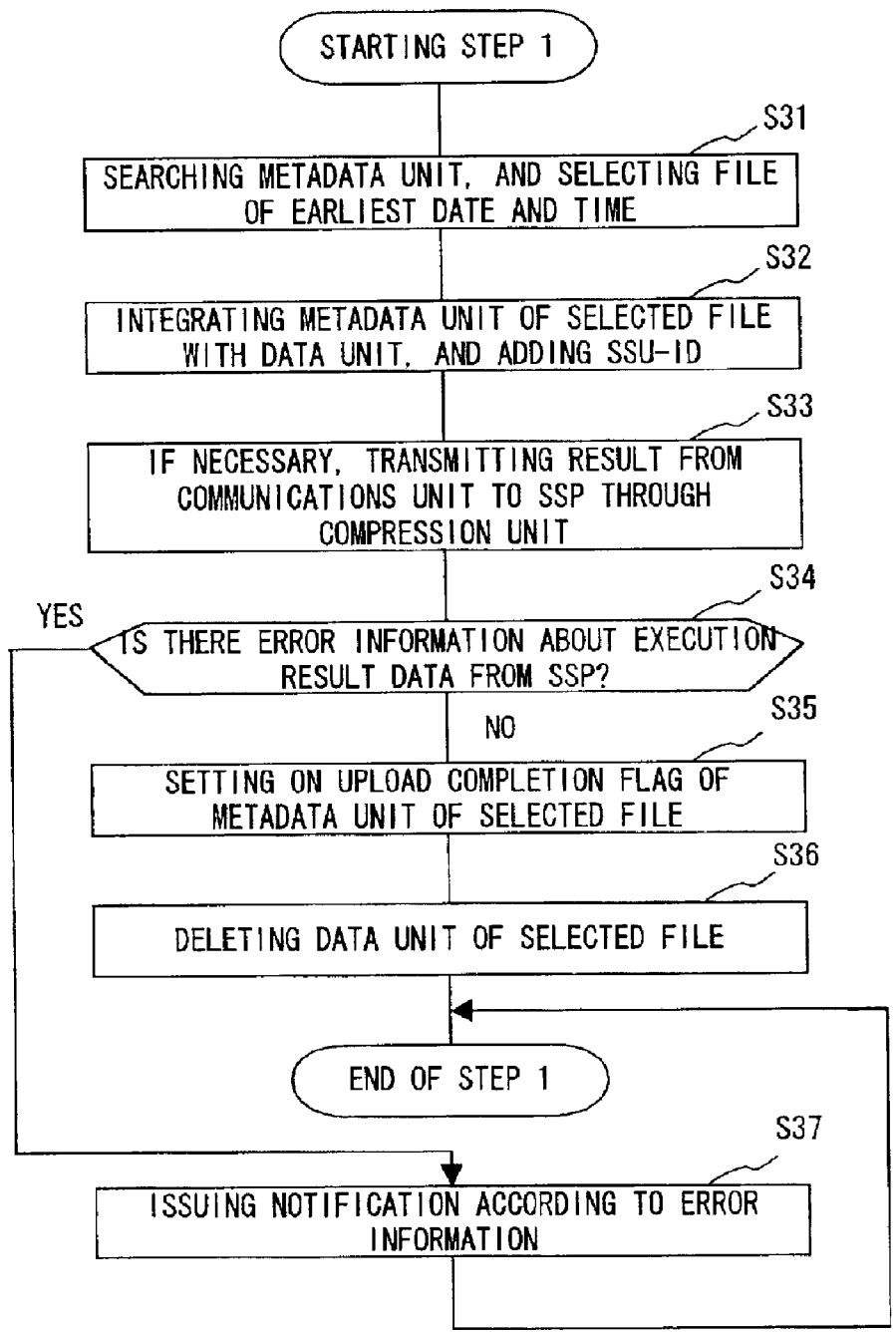
F I G. 8

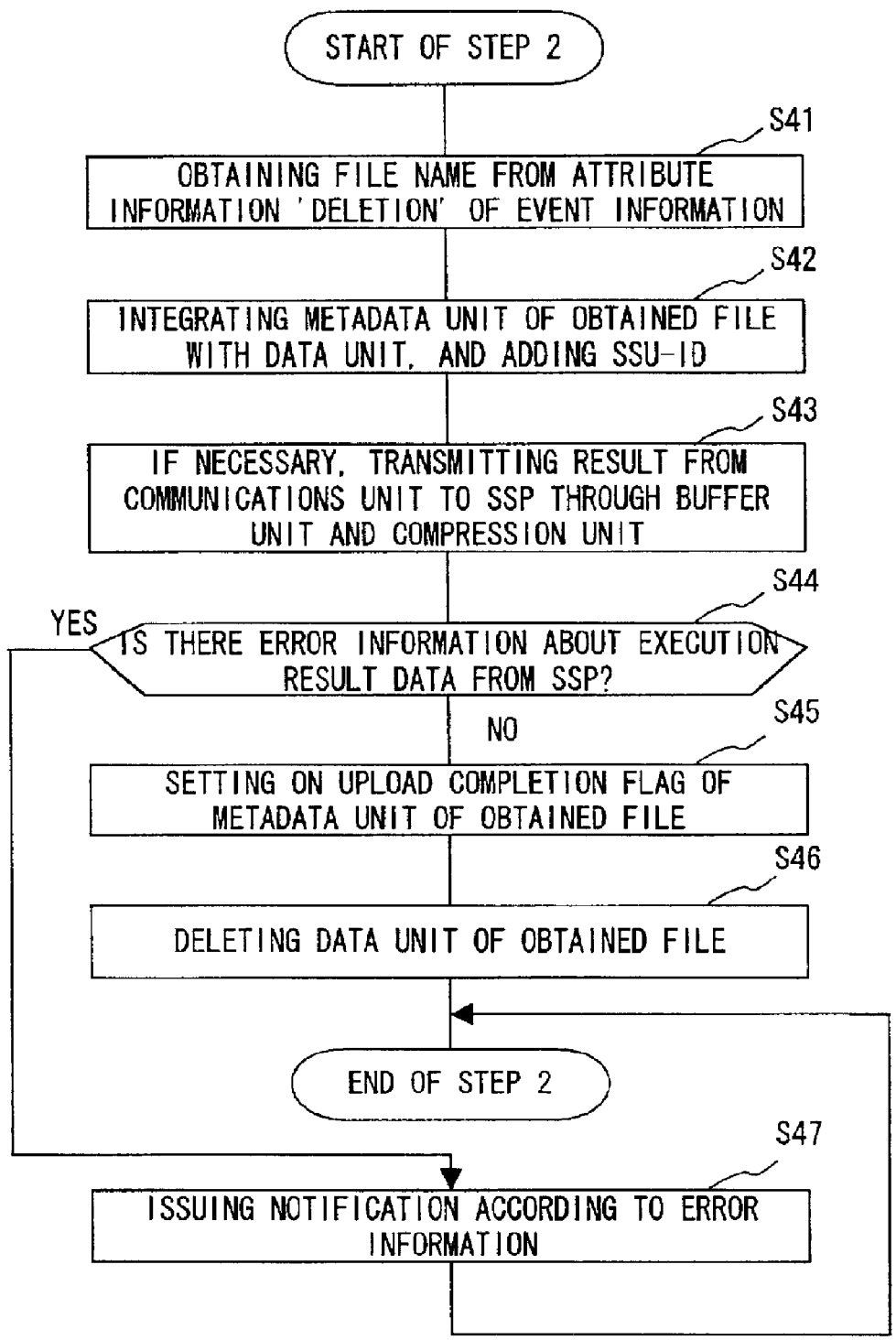
F I G. 9

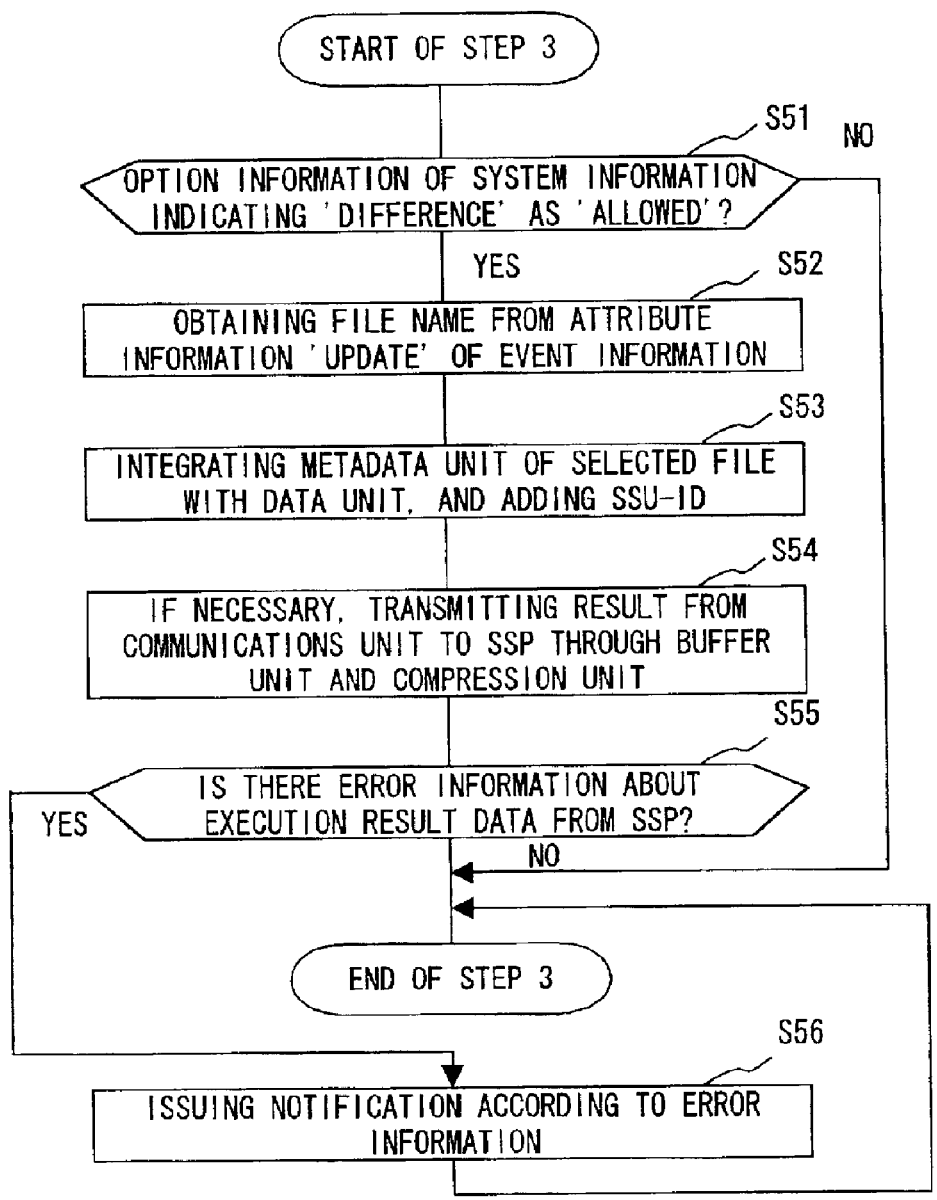
F I G. 1 0

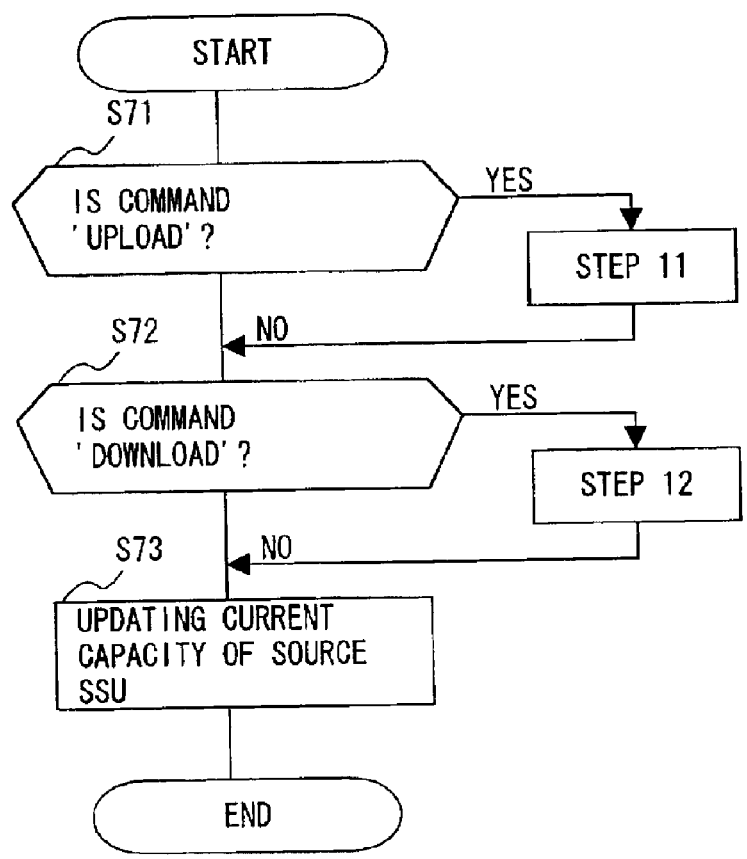
F I G. 1 2

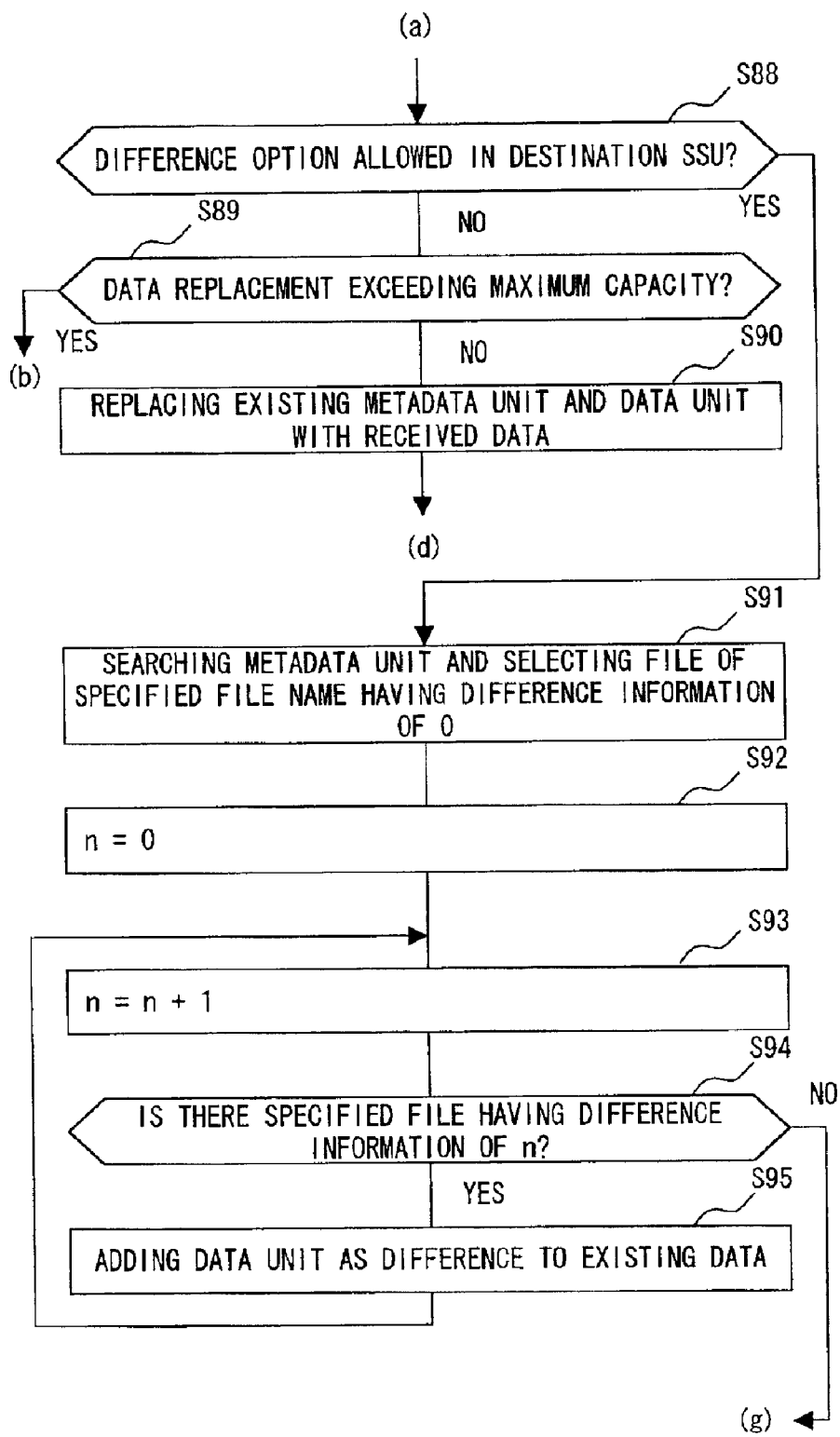
F I G. 1 4

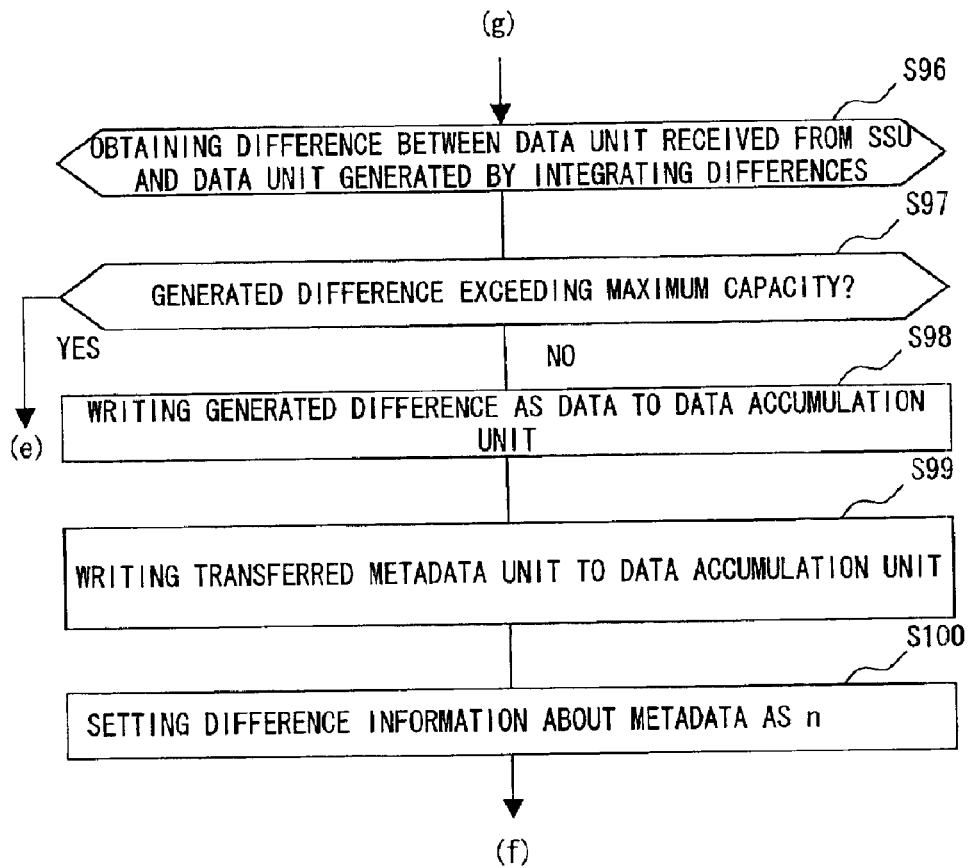
F I G. 1 5

STORAGE SERVICE METHOD, STORAGE SERVICE USER TERMINAL DEVICE, STORAGE SERVICE PROVIDING DEVICE, AND STORAGE MEDIUM STORING STORAGE SERVICE PROGRAM

BACKGROUND OF THE INVENTION

1. Field of the Invention

The present invention relates to a storage service method, a storage service user terminal device, a storage service providing device, and a storage medium storing a storage service program.

2. Description of the Related Art

Recently, with the enhanced level of using personal computers and increasing capacity of applications, there is an increasing amount of data processed by users, thereby incurring a higher data management cost, a larger possibility of losing data, an undesired high cost of installing a storage device. Furthermore, although there has been an increasing number of portable terminals these days, their storage capacity is limited, and necessary data is to be loaded each time it is required. Therefore, an improvement has been strongly demanded.

Conventionally, when a personal computer become short of a disk capacity of a hard disk device, the user has to manage to extend the hard disk device, etc., and it is also necessary to frequently make a backup copy as countermeasures against lost data. Furthermore, with a PDA and a portable telephone, there is the possibility that similar problems can occur.

When a hard disk device is extended, there have been the problems of a high hardware cost, large installation space, and a high working cost. A backup process has similar problems. In the existing storage service using a Web page, a user has to write and read data by himself or herself, and cannot be free of the laborious processes.

SUMMARY OF THE INVENTION

The present invention aims at providing a service of constantly reserving a free capacity of the storage device directly connected to a storage service user terminal device as if the storage service user terminal device had an unlimited storage area.

According to an aspect of the storage service method of the present invention, a free capacity of a data accumulation unit of a user terminal device is monitored, and the data in the data accumulation unit is transferred to the storage service providing device through a network such that the free capacity cannot be smaller than a predetermined value.

According to the present invention, the user terminal device can constantly reserve a predetermined free capacity. Therefore, the user terminal device can function as if it had an unlimited storage capacity.

According to another aspect of the storage service method of the present invention, it is determined whether or not data is deleted or updated in the user terminal device, and transfers the data before deleted or updated to the storage service providing device when the data is deleted or updated.

According to the present invention, data before deleted or updated can be stored in the storage service providing device. Therefore, the original data can be restored even after the data has been mistakenly deleted or discarded.

According to a further aspect of the present invention, policy information defining the process of data is added to the data, and the data is transferred according to the policy information when the data is transferred from the data accumulation unit to the storage service providing device.

According to the present invention, when the data in the data accumulation unit of the user terminal device is transferred to the storage service providing device, the data having the user-specified policy information can be selected and transferred.

The present invention can also be configured as follows. In the following explanation, the devices (a storage service user terminal device, etc.) of the user who uses data are referred to as a storage service user (SSU), and the storage service providing devices of a service provider are referred to as a storage service provider (SSP).

(1) In a storage service method for use with the storage service system for transferring data between a storage service user (SSU) who uses the data and a storage service provider (SSP) who provides a storage service, data is automatically downloaded and uploaded between the storage service provider (SSP) and the storage service user (SSU) such that the free capacity of the data accumulation unit of the storage service user (SSU) cannot be smaller than a specified value, thereby constantly providing a data free area (storage space) for the storage service user (SSU).

(2) The storage service user (SSU) of the storage service system for transfer data between the storage service user (SSU) who uses the data and the storage service provider (SSP) for providing a storage service includes a data accumulation unit for accumulating data, a free capacity monitor unit for monitoring the free capacity of the data accumulation unit, a control unit for performing various controlling processes, an upload determination unit for determining whether or not data is to be uploaded, and a download determination unit for determining whether or not data is to be downloaded. With the configuration, data is automatically uploaded and downloaded between the storage service user (SSU) and the storage service provider (SSP) according to the monitor information of the free capacity monitor unit such that the free capacity of the data accumulation unit cannot be smaller than a predetermined value, thereby constantly providing a data free area (storage space).

(3) The storage service user (SSU) according to (2) above can further include a deletion detection unit. With the configuration, before the storage service user (SSU) deletes data, the data is automatically uploaded into the storage service provider (SSP) based on the detection result of the deletion detection unit, and the data is downloaded from the storage service provider (SSP) at a request of the storage service user (SSU), thereby restoring the data after it is deleted.

(4) The storage service user (SSU) according to (2) or (3) above can further include an update detection unit. With the configuration, when the update detection unit detects updated data, the data before the update is uploaded into the storage service provider (SSP), and the data at any past time can be downloaded from the storage service provider (SSP) at a request of the storage service user (SSU).

(5) A storage service provider (SSP) for providing a storage service and for use in a storage service system for transferring data between a storage service user (SSU) who uses the data and the storage service provider (SSP) includes a control unit for performing various controlling processes, a data accumulation unit for accumulating data, a difference generation unit for generating a difference between the latest data and the past data, and a difference integration unit for integrating differences of data. With the configuration, when the data has been uploaded from the storage service user (SSU) in the past, the difference generation unit generates the difference from the past data, and only the generated difference is stored in the data accumulation unit in the storage service provider (SSP).

(6) A storage service user (SSU) including a date and time determination unit for determining the date and time of data, and the uploaded data being automatically selected by the date and time determination unit based on the update date and time of the data.

(7) A storage service user (SSU) including a data use frequency determination unit for determining the use frequency of data, and the uploaded data being automatically selected by the data use frequency determination unit based on the use frequency.

(8) A storage service user (SSU) further including a policy management unit for defining the process of data, and the data uploaded into the storage service provider (SSP) being automatically selected based on the policy defined in the policy management unit in advance by the storage service user (SSU).

(9) A storage service user (SSU) including a data use detection unit for detecting the use of data, and automatically downloading data from the storage service provider (SSP) based on the detection result of the data use detection unit when the data uploaded into the storage service provider (SSP) is used by the storage service user (SSU)

(10) A storage service user (SSU) including a relevant data determination unit for determining relevant data, and downloading plural pieces of relevant data based on the determination result of the relevant data determination unit when the relevant data is downloaded into the storage service provider (SSP).

(a) In the storage service system according to (1) above, data is automatically uploaded between the storage service provider (SSP) and the storage service user (SSU) such that the free capacity of the data accumulation unit of the storage service user (SSU) cannot be smaller than a specified value, thereby constantly providing a data free area for the storage service user (SSU) from the storage service provider (SSP).

Thus, by performing a controlling process such that a free capacity of the data accumulation unit (storage device) directly connected to the storage service user (SSU) can be constantly reserved, a service can be provided as if the storage service user (SSU) had an unlimited storage area.

(b) The storage service user (SSU) according to (2) above can be constantly provided with a data free area by the storage service provider (SSP) by automatically uploading and downloading data between the storage service user (SSU) and the storage service provider (SSP) such that a free capacity of the data accumulation unit cannot be smaller than a specified value.

Since data can be automatically transferred between the storage service user (SSU) and the storage service provider (SSP) such that the free capacity of the data accumulation unit (storage device) of the storage service user (SSU) can be constantly reserved, the storage service user (SSU) can be provided with a service as if it had an unlimited storage. Therefore, the storage management cost can be reduced, and the data can be protected from being lost.

(c) Before the storage service user (SSU) according to (3) above deletes data, it automatically uploads the data into the storage service provider (SSP) based on the detection result of the deletion detection unit, and downloads the data from the storage service provider (SSP) at a request of the storage service user (SSU), thereby constantly restoring deleted data.

Therefore, the storage management cost can be reduced, and the data can be protected against destruction.

(d) When the update detection unit detects updating data, the storage service user (SSU) according to (4) above uploads the data obtained before the update into the storage service provider (SSP), and downloads the data at any past time from the storage service provider (SSP) at a request of the storage service user (SSU).

Therefore, the storage service user (SSU) can be provided with a service as if all past data were owned by the storage service user (SSU). As a result, the storage management cost can be reduced, and the data can be protected against destruction.

(e) If the data has been uploaded from the storage service user (SSU), then the storage service provider (SSP) according to (5) above generates a difference from the past data by the difference generation unit, and only the generated difference is stored in the storage service provider (SSP).

Thus, the amount of data stored in the storage service provider (SSP) can be reduced, and the SSP can provide a service for the storage service user (SSU) at a low cost as if the storage service user (SSU) owned unlimited storage.

Additionally, the storage service provider (SSP) can collect a service rate depending on the amount of accumulated data and an additional service rate for the management of a version number (which refers to the same data having updated contents) from the storage service user (SSU).

BRIEF DESCRIPTION OF THE DRAWINGS

FIG. 1 is a block diagram of the entire system according to an embodiment of the present invention;

FIG. 3 is a block diagram of the SSP according to an embodiment of the present invention;

FIGS. 4A and 4B show the event information/SSU data accumulation unit according to an embodiment of the present invention;

FIG. 5 shows the data format according to an embodiment of the present invention;

FIG. 7 is a flowchart of the process of the SSU according to an embodiment of the present invention;

FIG. 8 is a flowchart of the process of the SSU in step 1 according to an embodiment of the present invention;

FIG. 9 is a flowchart of the process of the SSU in step 2 according to an embodiment of the present invention;

FIG. 10 is a flowchart of the process of the SSU in step 3 according to an embodiment of the present invention;

FIG. 12 is a flowchart of the process of the SSP device according to an embodiment of the present invention

FIG. 14 is a flowchart (2) of the process in step 11 according to an embodiment of the present invention;

FIG. 15 is a flowchart (3) of the process in step 11 according to an embodiment of the present invention.

DESCRIPTION OF THE PREFERRED EMBODIMENTS

Figure 2:
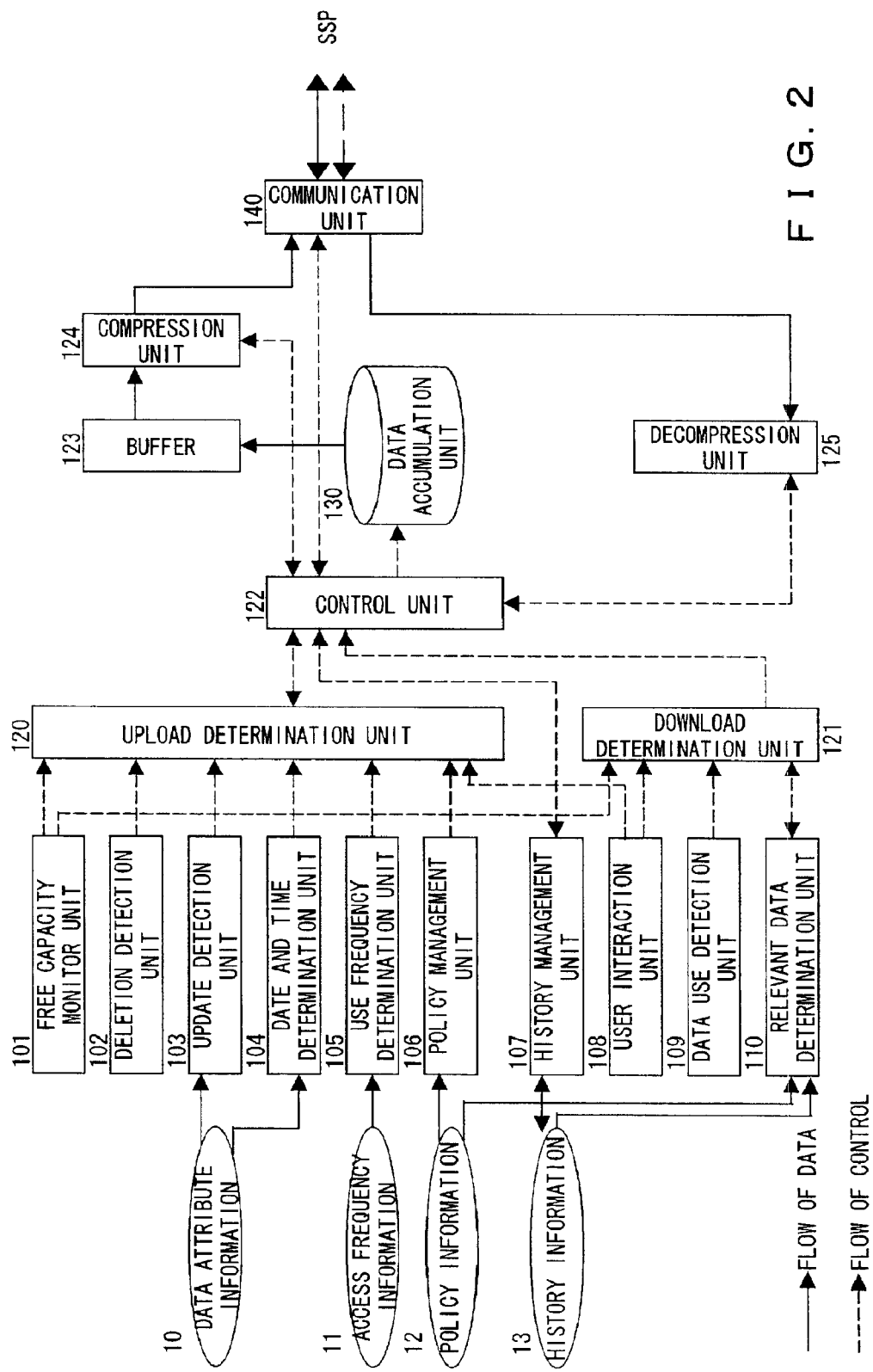
FIG. 2 is a block diagram of the SSU according to an embodiment of the present invention.

The embodiments of the present invention are described below in detail by referring to the attached drawings. In the following explanation, the storage service user (storage service user terminal device) is referred to as an SSU, and the storage service provider (storage service providing device) is referred to as an SSP. The data transfer from the SSU to the SSP is described as 'uploading data', the data transfer from the SSP to the SSU is described as 'downloading data', and the system connecting the SSU to the SSP through a network is referred to as a 'storage service system'.

§1 General Description of the Storage Service System

FIG. 1 is a block diagram of the entire system. The outline of the storage service system is described below by referring to FIG. 1. This system is a storage service system for transferring data between a storage service user (SSU) which uses the data and a storage service provider (SSP) which provides a storage service. A practical example is shown below.

The storage service system sown in FIG. 1 is an example of a system for automatically uploading and downloading data by communicating data between an SSU which uses a data accumulation service and an SSP which provides a data accumulation area for the SSU through a network.

In this case, the SSU includes a personal computer, a portable telephone, a portable terminal, etc. The SSP can be provided by an ISP (Internet service provider), or an independent operation subject can provide a service. For example, the following device can realize the storage service system.

A device for automatically uploading/downloading data performs a controlling process such that the free capacity of the storage device (DAS (direct attached storage)) directly connected to the SSU can be constantly reserved, thereby providing a service as if the SSU had an unlimited storage area.

The determination of the data to be uploaded depends on the update date and time of data, the access frequency, etc. Otherwise, a probable item list can be presented to the user for interactive determination. Furthermore, the data before deletion can be transferred. Thus, the deleted data can be constantly stored in the SSP. Therefore, if the user notices later that data has been mistakenly deleted, the data can be downloaded from the SSP and restored.

Data to be uploaded can be determined based on whether or not the data has been updated. In this case, since all data is accumulated in the SSP each time it is updated, any past data can be downloaded from the SSP although a file is mistakenly changed.

§2 Explanation of System Configuration

(1) Configuration of Entire System

As shown in FIG. 1, the system has an SSU and an SSP connected to each other through a network (public line, LAN, etc.). An SSU (for example, a personal computer) includes an application (application program), an upload/download determination unit, a DAS (a storage device including a hard disk device, RAM, etc.). The DAS includes various storage devices which can be accessed at a relatively high speed.

The SSP comprises a communications unit for communicating with the SSU, a control unit, storage (data accumulation device capable of accumulating data of large capacity), etc., and provides a data accumulation capacity. The storage (data accumulation device) can be any device having large capacity storage means regardless of the access speed, and includes a magneto-optical disk device, a large capacity magnetic disk device, a magnetic tape library device, an optical disk library device, etc.

(2) Detailed Configuration of SSU

FIG. 2 is a block diagram of an SSU. The above mentioned SSU is configured as shown in FIG. 2. That is, the SSU comprises a free capacity monitor unit 101 for monitoring the free capacity of a data accumulation unit 130, a deletion detection unit 102 for detecting data deletion; a update detection unit 103 for detecting updating data; a date and time determination unit 104 for determining date and time (or date) of data; a use frequency determination unit 105 for determining the use frequency, a policy management unit 106 for managing the policy information; a history management unit 107 for managing the upload history; a user interaction unit 108 for interaction with a user; a data use detection unit 109 for detecting data being used; a relevant data determination unit 110 for determining relevant data; an upload determination unit 120 for determining data to be uploaded; a download determination unit 121 for determining data to be downloaded, a control unit 122 for performing various controlling processes; a buffer 123 for temporarily storing data; a compression unit 124 for compressing data; a decompression unit 125 for restoring compressed data; the data accumulation unit 130 for accumulating data; a communications unit 140 for communications with an SSP, etc.

Additionally, the SSU processes data attribute information 10, access frequency information 11, policy information 12, history information 13, etc., and processes data. The portions indicated by the solid lines in FIG. 2 show the flow of data, and the portions indicated by the dotted lines show the flow of control.

The above mentioned SSU can be, for example, the device realized by a personal computer. The free capacity monitor unit 101, the deletion detection unit 102, the update detection unit 103, the date and time determination unit 104, the use frequency determination unit 105, the policy management unit 106, the history management unit 107, the user interaction unit 108, the data use detection unit 109, the relevant data determination unit 110, the upload determination unit 120, the download determination unit 121, the compression unit 124, the decompression unit 125, the communications unit 140, etc. can be realized by the CPU of the personal computer executing a program.

(3) Detailed Configuration of SSP

FIG. 3 is a block diagram of the SSP. The SSP is configured as shown in FIG. 3. That is, the SSP comprises a communications unit 200 for communications with the SSU; a difference generation unit 201 for generating a difference in data; a data accumulation unit 202 for accumulating data; a difference integration unit 203 for integrating the difference in data; a buffer 204 for temporarily storing data; a control unit 205 for performing various controlling processes, etc.

The SSP also processes SSU information 20, etc. transferred from the SSU. The portions indicated by solid lines shown in FIG. 3 show the flow of data, and the portions indicated by dotted lines show the flow of control.

Furthermore, the communications unit 200, the difference generation unit 201, the difference integration unit 203, etc. can be realized by the CPU in the SSP executing the program.

§3 Descriptions of the Operations of SSU

Described below are the operations of an SSU. When the free capacity of the storage (data accumulation unit 130) in the SSU becomes smaller than a predetermined threshold, the free capacity monitor unit 101 of the SSU notifies the upload determination unit 120 of it. When the free capacity of the storage in the SSU becomes larger than the predetermined threshold, the free capacity monitor unit 101 of the SSU notifies the download determination unit 121 of it.

When an instruction to delete data in the SSU is issued, the deletion detection unit 102 notifies the upload determination unit 120 of it. The update detection unit 103 detects the data to be updated according to the date and time information of the data attribute information 10, and notifies the upload determination unit 120 of it.

According to the date and time information of the data attribute information 10, the date and time determination unit 104 notifies the upload determination unit 120 of, for example, the data of the earliest access date. The use frequency determination unit 105 notifies the upload determination unit 120 of the least frequently used data according to the access frequency information 11.

The policy management unit 106 notifies the upload determination unit 120 of the data matching a predetermined policy (for example, an extention is bak, etc.) according to the policy information 12. The history management unit 107 manages the history information about the data uploaded from the SSU to the SSP as the history information 13.

The user interaction unit 108 performs an interaction process of allowing a user to specify which data to be uploaded or downloaded, etc., and the result is transmitted to the upload determination unit 120 and the download determination unit 121. The data use detection unit 109 notifies the download determination unit 121 that the data to be used by the SSU is not stored in the SSU.

The relevant data determination unit 110 determines the data to be downloaded using the policy information 12 and the history information 13, and notifies the download determination unit 121 of the result. That is, for example, by referring to the history information 13, the data accessed by a user, and the relevant data used with the data in the past, or the data having the relevant policy information by referring to the policy information are retrieved, and the retrieval result is transmitted to the download determination unit 121.

The upload determination unit 120 notifies the control unit 122 of the upload timing and data according to the information from the free capacity monitor unit 101, the deletion detection unit 102, the update detection unit 103, the date and time determination unit 104, the use frequency determination unit 105, the policy management unit 106, and the user interaction unit 108.

The download determination unit 121 notifies the control unit 122 of the download timing and data according to the information from the free capacity monitor unit 101, the user interaction unit 108, the data use detection unit 109, and the relevant data determination unit 110. The control unit 122 controls the entire SSU. The buffer 123 accumulates the data transferred from the data accumulation unit 130, and transfers the data to the compression unit 124 when the amount of accumulated data exceeds a predetermined threshold.

The compression unit 124 compresses the data transmitted from the buffer 123, and transfers it to the communications unit 140. The communications unit 140 transmits and receives data and control data to and from the SSP. The decompression unit 125 restores the compressed data downloaded from the SSP through the communications unit 140, and transfers the data to the data accumulation unit 130.

§4 Explanation of the Operations of SSP

Described below are the operations of the SSP. The communications unit 200 communicates data and control data from the SSU. If the name of the data transmitted from the SSU through the communications unit 200 is the same as the name of the data uploaded before, then the difference generation unit 201 extracts the difference from the previous data. Otherwise, the data is transfers as is to the data accumulation unit 202.

The data accumulation unit 202 accumulates the data transferred from the difference generation unit 201, and transfers specified data to the difference integration unit 203 when the data is downloaded. If the data transferred from the data accumulation unit 202 is difference data, then the difference obtained from the data is integrated to restore the original data. Otherwise, the data is transferred as is to the buffer 204.

In response to the notification from the control unit 205, the buffer 204 transfers data in the buffer 204 to the communications unit 200. The SSU information 20 records the maximum available capacity for each SSU, etc. according to which the control unit 205 transmits a message of, for example, prohibition of the upload exceeding the available capacity. The control unit 205 performs the entire controlling process.

§5 Explanation of Data, Etc. of SSU and SSP

Figures 6A, 6B:
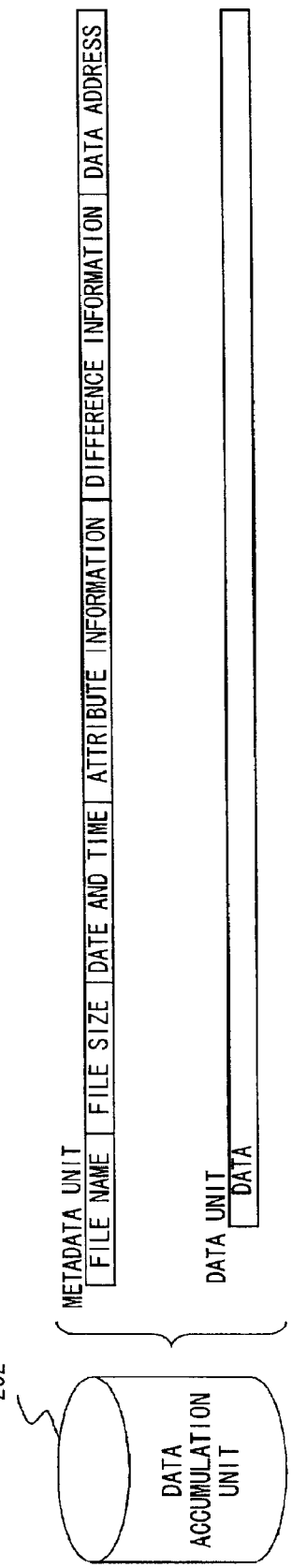
FIGS. 6A and 6B show the SSU information/SSP data accumulation unit according to an embodiment of the present invention.

FIG. 4 shows the event information/SSU data accumulation unit. In FIG. 4, FIG. 4A shows event information, and FIG. 4B shows the SSU data accumulation unit. FIG. 5 shows data formats. In FIG. 5, FIG. 5A shows an upload data format, FIG. 5B shows an execution result format, FIG. 5C shows a download request data format, and 5D show a download data format from the SSP. FIG. 6 shows the SSU information/SSP data accumulation unit. FIG. 6A shows SSU information, FIG. 6B shows the data stored in the SSP data accumulation unit 202.

(1) Event Information

As shown in FIG. 4A, event information contains the items of the type, occurrence, and attribute information. The type can be a free capacity, deletion, update, and use. The occurrence contains existence or non-existence information. Furthermore, the attribute information contains, for example, a file name, etc.

(2) SSU Data Accumulation Unit 130

As shown in FIG. 4B, the SSU data accumulation unit 130 comprises a system information unit, a metadata unit, and a data unit. The system information unit contains an SSU-ID (identification information of SSU), a total capacity, a used amount, a free capacity, option information, etc. The metadata unit contains a file name, a file size, a date and time, attribute information, an upload notification, a download notification, a data address, etc. The data unit contains data.

(3) Data Format

As shown in FIG. 5A, the upload a sequence number, request data format (data format) includes an SSU-ID (identification information about SSU), a command name [upload], file name, a file size, a date and time, attribute information, and data in this order. As shown in FIG. 5B, the execution result data format contains a sequence number, a command name [upload], and error information in this order.

As shown in FIG. 5C, the download request data format (data format) contains a sequence number, an SSU-ID, a command name [download], and a file name in this order. As shown in FIG. 5D, the download data format from the SSP contains a sequence number, a command name [download], a file name, a file size, a date and time, attribute information, and data in this order.

(4) SSU Information

As shown in FIG. 6A, the SSU information contains the items of an SSU-ID, the maximum capacity, an option 1 (difference), an option 2, a current capacity, and information (or data) is set for each item.

(5) SSP Data Accumulation Unit 202

The SSP data accumulation unit 202 includes a metadata unit and a data unit. The metadata unit stores a file name, file size, date and time, attribute information, difference information, data address, etc. Data is written to the data unit.

§6 Detailed Explanation of Process of SSU (1) Process of Entire SSU

FIG. 7 is a flowchart of the process of the SSU including the upload determination unit 120, the download determination unit 121, and the control unit 122. The process of the entire SSU is described below by referring to FIG. 7. S21 through S25 are process steps. The processes in step 1 through step 4 are described later. The SSU performs the processes as follows.

In the SSU, the portions for performing a storage service are normally operated by the control of the OS, etc. After event information (refer to FIG. 4A) is generated by detecting the monitored free capacity, deleting file, updating file, using file, etc., the SSU (storage service unit) is activated.

First, the SSU determines whether or not the event information indicates a 'free capacity' (S21 in FIG. 7). If it is not a free capacity (NO in S21), the SSU determines whether or not the event information indicates 'deleted' (S22). If the event information indicates a free capacity in the process in step S21 (YES in S21), the process in step 1 is performed, and control is passed to the process in S22.

Then, if the event information is not 'deleted' in the process in S22 (NO in S22), it is determined whether or not the event information is 'updated' (S23). If the event information is 'deleted' in the process in S22 (YES in S22), then the process in step 2 is performed, and control is passed to the process in S23.

If the event information is not 'updated' in the process in S23 (NO in S23), then it is determined whether or not the event information is 'used' (S24). If the event information is 'updated' in the process in S23 (YES in S23), then the process in step 3 is performed, and control is passed to the process in S24.

If the event information is not 'used' in the process in S24 (NO is S24), the 'amount of use' and 'free capacity' of the system information unit are updated (S25), and the process is suspended. If the event information is 'used' in the process in S24 (YES in S24), the process in step 4 is performed, and control is passed to the process in S25.

(2) Process in 'step 1' in SSU

FIG. 8 is a flowchart of the process in step 1 of the SSU. The process in step 1 of the SSU is described below by referring to FIG. 8. S31 through S37 indicate respective process steps.

In the process in step 1, the metadata unit (refer to FIG. 4B) is searched, the file of the earliest date and time is selected (S31 in FIG. 8), the metadata unit of the selected file is integrated with the data unit, and an SSU-ID is added (refer to FIG. 5A) (S32). If necessary, the result is transmitted from the communications unit to the SSP through the buffer unit and the compression unit (S33).

Then, it is determined whether or not there is error information (refer to FIG. 5B) about the execution result data from the SSP (NO in S34). If not, the upload completion flag of the metadata unit of the selected file is set on (S35), and the data unit of the selected file is deleted (S36), thereby terminating the process in step 1.

If it is determined in the process in S34 that there is error information (YES in S34), then a notification of the error according to the error information is informed (S37), and the process in step 1 terminates.

(3) Process in Step 2 of SSU

FIG. 9 is a flowchart of the process in step 2 of the SSU. The process in step 2 of the SSU is described below by referring to FIG. 9. S41 through S47 indicate respective process steps.

In this process in step 2, a file name is first obtained from the attribute information (refer to FIG. 4A) of 'deleted' of the event information (S41 in FIG. 9), the metadata unit and the data unit of the obtained file are integrated, and an SSU-ID (identification information about SSU) is added (refer to the upload data format shown in FIG. 5A) (S42). If necessary, the result is transmitted from the communications unit to the SSP through the buffer unit and the compression unit (S43).

Then, it is determined whether or not there is error information (refer to the execution result data format in FIG. 5B) about the execution result data from the SSP (S44). If not (NO in S44), the upload completion flag of the metadata unit of the obtained file is set on (S45), and the data unit of the obtained file is deleted (S46), thereby terminating the process in step 2. If there is error information in the process in S44 (YES in S44), then the error according to the error information is informed (S47), and the process in step 2 terminates.

(4) Process in Step 3 of SSU

FIG. 10 is a flowchart of the process in step 3 of the SSU. The process in step S3 of the SSU is described below by referring to FIG. 10. S51 through S54 indicate respective process steps.

In step 3, it is first determined whether or not a difference is allowed for the option information within the system information (refer to FIG. 4B) (S51 shown in FIG. 10). If the difference option is allowed (YES in S51), then a file name is obtained from the attribute information 'updated' about the event information (refer to FIG. 4A) (S52), the metadata unit and the data unit (the upload data format shown in FIG. 5A) of the selected file is integrated, and an SSU-ID is added (S53).

If necessary, the result is transmitted from the communications unit to the SSP through the buffer unit and the compression unit (S54), thereby terminating the process in step 3.

Then it is determined whether or not there is error information (refer to the execution result data format in FIG.5B) about the execution result data from SSP (S55). If not (NO in S55), the process in step 3 terminates. If there is error information in the process in S55 (YES in S55), then the error according to the error information is informed (S56), and the process in step 3 terminates.

If the option information does not indicate the existence of 'difference' (NO in S51), then the process in step 3 terminates as is.

(5) Process in Step 4 of SSU

Figure 11:
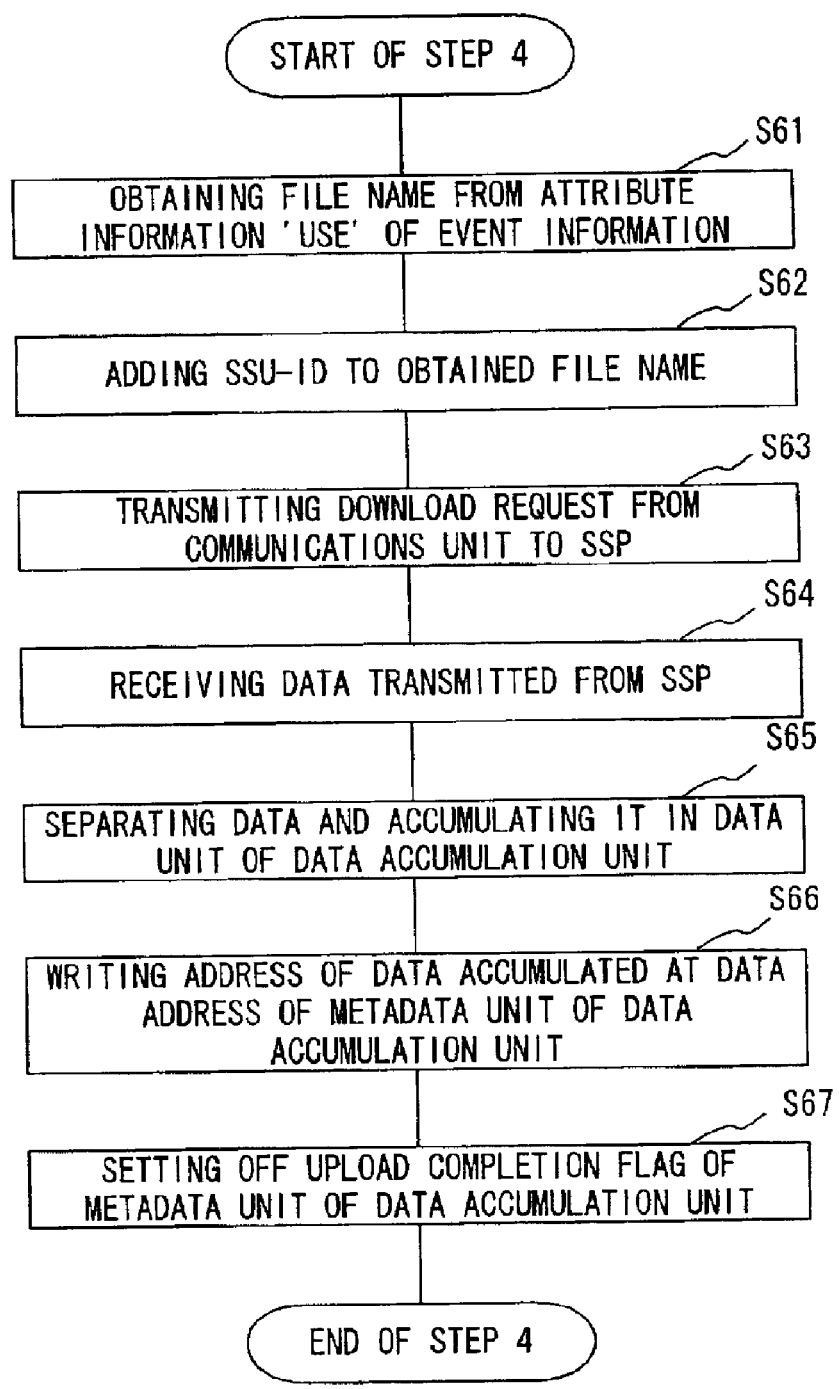
FIG. 11 is a flowchart of the process of the SSU in step 4 according to an embodiment of the present invention.

FIG. 11 is a flowchart of the process in step 4 of the SSU. The process in step 4 of the SSU is described below by referring to FIG. 11. S61 through S67 indicate the respective process steps.

In the process in step 4, a file name is obtained from the attribute information (refer to FIG. 4A) of the event information 'use' (S61 shown in FIG. 11), and adds an SSU-ID (identification information about the SSU) to the obtained file name (refer to the download request data format shown in FIG. 5C) (S62). Then, a download request is transmitted from the communications unit 140 to the SSP (S63). Then, the data transmitted from the SSP is received (refer to the download data format from the SSP shown in FIG. 5D) (S64), the data is separated, and is accumulated in the data unit of the data accumulation unit 130 (refer to FIG. 4B) (S65).

Then, the address of the data accumulated at the data address of the metadata unit of the data accumulation unit 130 is written (S66), and the upload completion flag is set OFF, thereby terminating the process in step 4.

§7 Detailed Explanation of Process of SSP

FIG. 12 is a flowchart of the process of the SSP device. The process of the entire SSP is described below by referring to FIG. 12. S71 through S73 indicate respective process steps. The processes in steps 11 and 12 are described later. The SSP performs the following processes.

First, the SSP determines whether or not the command indicates upload (S71 shown in FIG. 12). If it does not indicate upload (NO in S71), then it determines whether or not the command indicates download (S72). On the other hand, if the command indicates upload (YES in S71), then the process in step 11 is performed, and control is passed to the process in S72.

If the command does not indicate download (NO in S72) in the process in S72, then the current capacity (refer to FIG. 6A) of the source SSU (S73), thereby terminating the process. On the other hand, if the command indicates download (YES in S72), then the process in step 12 is performed, thereby passing control to the process in S73.

(2) Process in Step 11 of SSP

Figure 13:
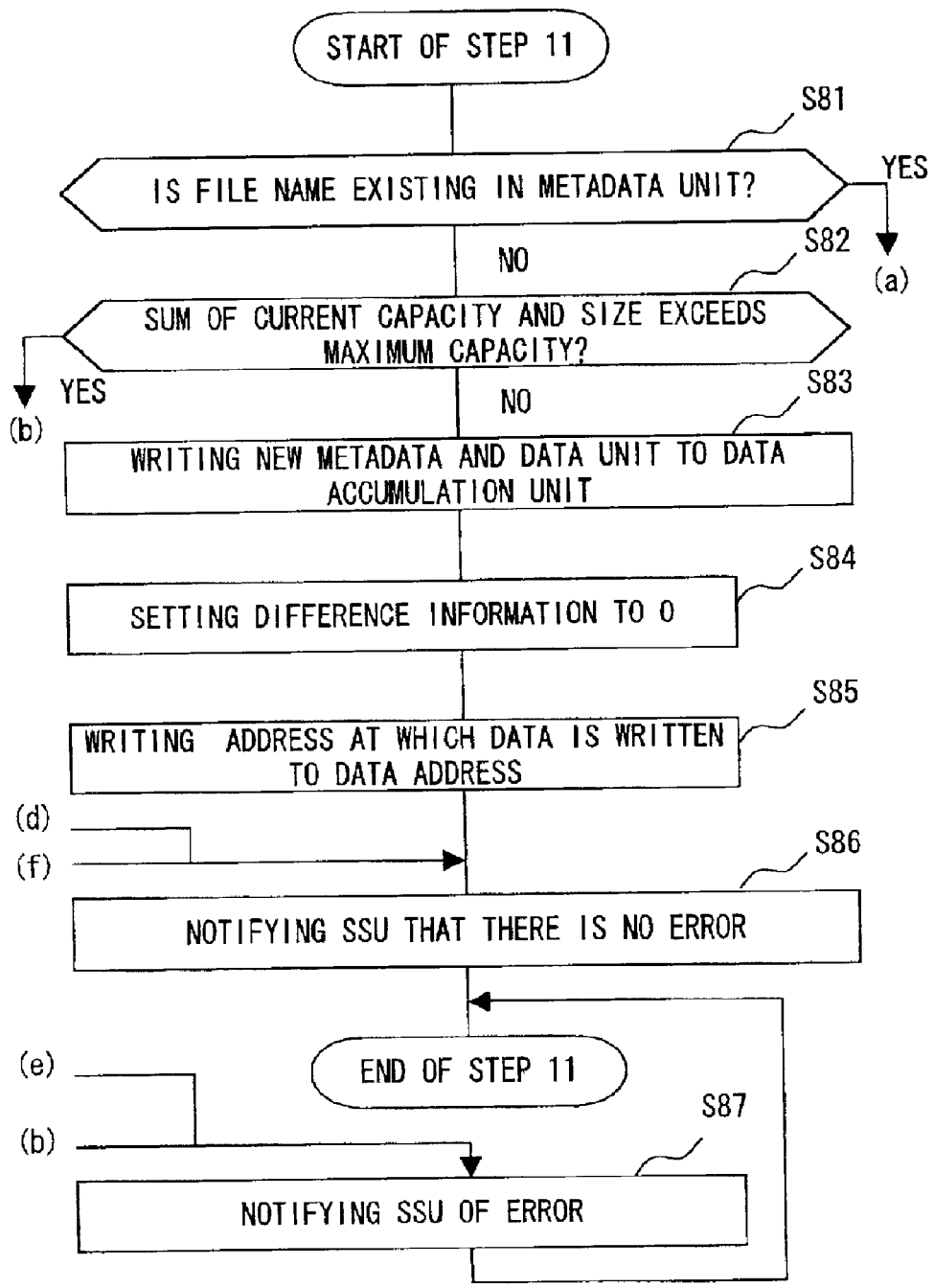
FIG. 13 is a flowchart (1) of the process in step 11 according to an embodiment of the present invention.

FIG. 13 is a flowchart (1) of the process in step 11, FIG. 14 is a flowchart (2) of the process in step 11, and FIG. 15 is a flowchart (3) of the process in step 11. The process in step 11 is described below by referring to FIGS. 13 through 15. S81 through S100 indicate respective process steps.

In the process in step 11 of the SSP, it is first determined whether or not the file name corresponding to the upload request is in the metadata unit (refer to FIG. 6B) (S81 shown in FIG. 13). If the file name does not exist (NO in S81), then it is determined whether or not the data size of the file added to the current capacity exceeds the maximum capacity assigned to the user (refer to FIG. 6A) (S82). As a result, if the maximum capacity is not exceeded (NO in S82), then new metadata and data unit are written to the accumulation unit 202 (S83), thereby setting the difference information to 0 (S84).

Then, the address at which data is written is written to the data address (S85), and a no error notification is transmitted to the SSU (refer to the execution result data format shown in FIG. 5B) (S86), thereby terminating the process in step 11.

When the maximum capacity is exceeded in the process in S82 (YES in S82), and an error notification is transmitted to the SSU (refer to the execution result data format shown in FIG. 5B) (S87), thereby terminating the process in step 11.

If it is determined in the process in S81 that the file name already exists in the metadata unit (YES in S81), then control is passed to S88 in the flowchart shown in FIG. 14, and the destination SSU determines whether or not a difference option (refer to the SSU information shown in FIG. 6A.) is allowed (S88). If the difference option is not allowed (NO in S88), it is determined whether or not the maximum capacity (refer to the SSU information shown in FIG. 6A) assigned to the SSU by replacing the data is exceeded (S89).

If the maximum capacity is exceeded by the replacement of the data (YES in S89), then control is passed to the process in S87 shown in FIG. 13. If the maximum capacity is not exceeded (NO in S89), then the existing metadata unit and data unit are replaced with the received data (S90), thereby passing control to the process in S86.

If it is determined in the process in S88 that the difference option is allowed (YES in S88), then the metadata unit is searched, the specified file name having the difference information of 0 is selected (S91), and n is cleared (n=0) (S93), and it is determined whether or not there is a specified file having the difference information of n (S94).

If it is determined in the process in S94 that there is a specified file having the difference information of n (YES in S94), then the data unit having the difference information of n is added as a difference to existing data, the version of the data is updated (S95), control is returned to the process in S93, the above mentioned processes are repeated, thereby obtaining the data of the latest version.

If it is determined in the process in S94 that there is no specified file having the difference information of n (NO in S94), then the generated data is the data of the latest version, control is passed to S96 shown in FIG. 15, and the difference data between the data unit transmitted from the SSU and the data unit generated by the integration of the difference is generated (S96). When the generated difference data is written to the data accumulation unit 202 of the SSP, it is determined whether or not the maximum capacity assigned to the SSU is exceeded (S97).

If it is determined in the process in S97 that the maximum capacity is not exceeded (NO in S97), then the generated difference data is written to the data accumulation unit 202 (S98), and the transferred metadata unit is written to the data accumulation unit 202 of the SSP (S99), and the difference information about the metadata is set as n (S100). Then, control is passed to the process in S86 shown in FIG. 13, and a no error notification is transmitted to the SSU.

If it is determined in the process in S97 that the maximum capacity is exceeded when the difference data is written to the data accumulation unit 202 of the SSP, then control is passed to the process in S87 shown in FIG. 13, thereby issuing an error notification to the SSU.

(3) Process in Step 12 of SSP

Figure 16:
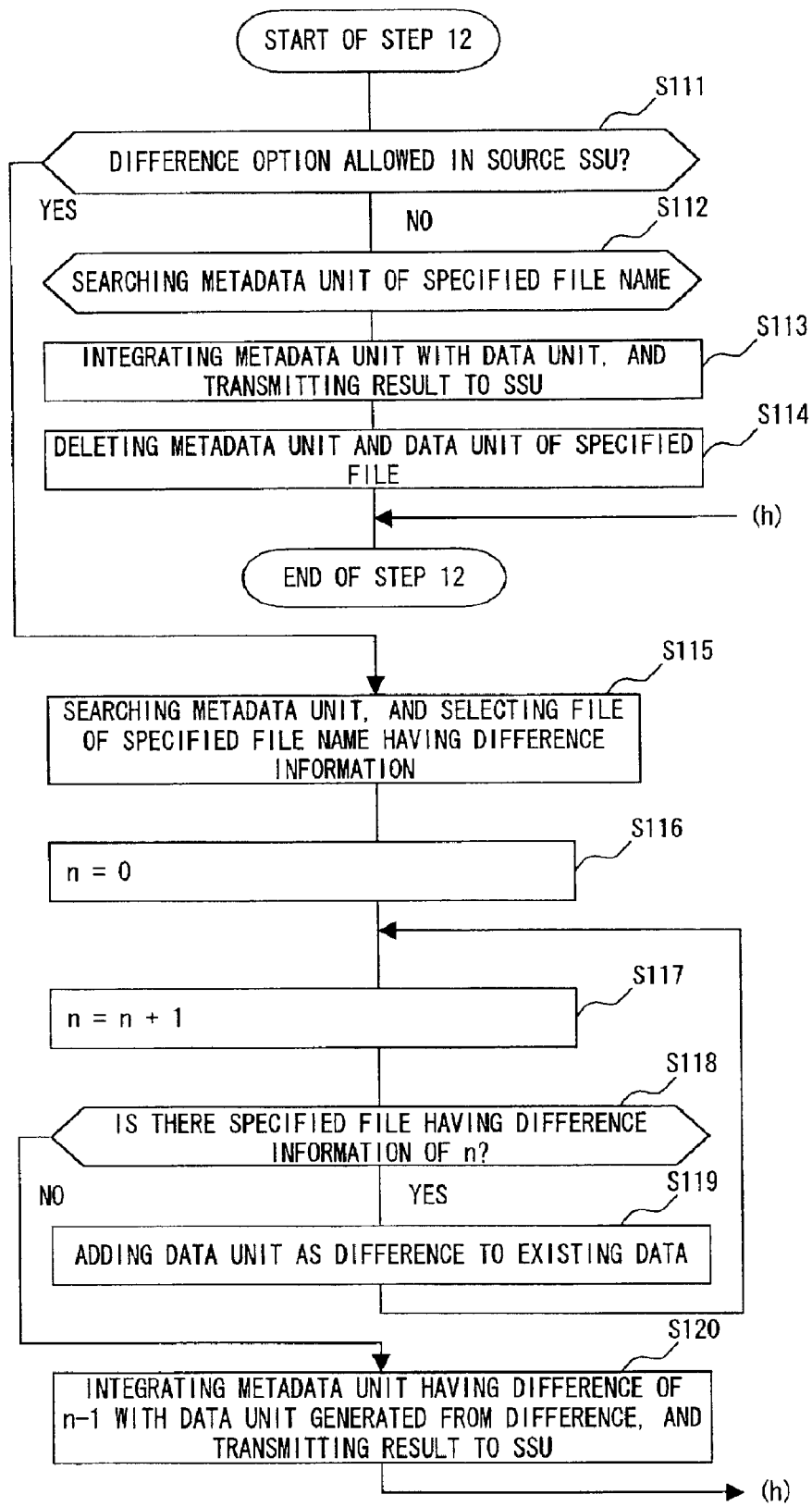
FIG. 16 is a flowchart of the process in step 12 according to an embodiment of the present invention.

FIG. 16 is a flowchart of the process in step 12. The process in step 12 is described below by referring to FIG. 16. S111 through S120 indicate the respective process steps.

In the process in step 12 of the SSP, the SSP first determines whether or not the difference option (refer to FIG. 6A) is allowed to the source SSU (S111 in FIG. 16). If the difference option is not allowed, then the metadata unit having the specified file name is searched (S112), the metadata unit is integrated with the data unit (refer to the download format from the SSP shown in FIG. 5A), and the result is transmitted to the SSU (S113). Then, the metadata unit and the data unit of the specified file are deleted (S114), and the process in step 12 terminates.

If it is determined in the process in S111 that the difference option is allowed (YES in S111), then the metadata unit is searched, a specified file name having the difference information of 0 is selected (S115), n is cleared (n=0) (S116), n is incremented (n=n+1) (S117), and it is determined whether or not there is a specified file having the difference information of n (S118).

If it is determined in the process in S118 that there is a specified file having the difference information of n (YES in S118), then the data unit is added as a difference to the existing data (S119), thereby passing control to the process in S117.

If it is determined in the process in S118 that there is not a specified file having the difference information of n (NO in S118), then the metadata unit having the difference information of n−1 is integrated with the data unit generated from the difference (refer to the download data format from the SSP shown in FIG. 5D), the result is transmitted to the SSU (S120), thereby terminating the process in step 12.

According to the above mentioned embodiments of the present invention, the following effect can be obtained.

(1) Since data is automatically transferred between the storage service user (SSU) and the storage service provider (SSP) such that the free capacity of the storage device (data accumulation unit) of the SSU, the storage service user (SSU) can be provided with the service as if the user owned himself or herself unlimited storage, thereby reducing the cost of the storage management.

(2) The storage service provider (SSP) can collect from the storage service user (SSU) a service rate depending on the amount of accumulated data, or the additional service rate for the management of the version numbers (updated data).

(3) In the storage service system, the upload and download of data can be automatically performed between the storage service provider (SSP) and the storage service user (SSU) such that the free capacity of the data accumulation unit of the storage service user (SSU) cannot be smaller than a predetermined value. Therefore, the storage service user (SSU) can be constantly provided with a data free area by the storage service provider (SSP).

Thus, the free capacity of the data accumulation unit (storage device) directly connected to the storage service user (SSU) is controlled to be constantly reserved, thereby allowing the storage service user (SSU) to be provided with a service as if the user had an unlimited storage area.

(4) The storage service user (SSU) can be constantly provided with a data free area by the storage service provider (SSP) by automatically uploading and downloading data between the user and the storage service provider (SSP) such that the free capacity of the data accumulation unit cannot be smaller than a predetermined value.

Thus, since data can be automatically transferred between the storage service user (SSU) and the storage service provider (SSP) the data accumulation unit (storage device) of the storage service user (SSU) such that a free capacity of the data accumulation unit (storage device) of the storage service user (SSU) can be constantly reserved, the storage service user (SSU) can be provided with a service as if the user had unlimited storage. Therefore, the management cost of the storage can be reduced.

(5) Before the storage service user (SSU) delete data, the user automatically uploads the data to the storage service provider (SSP), and downloads the data from the storage service provider (SSP) at a request of the storage service user (SSU), thereby constantly restoring deleted data.

Therefore, the cost of managing the storage can be reduced, and the data can be protected against destruction.

(6) The storage service user (SSU) uploads the data to the storage service provider (SSP) when the update of the data is detected by the update detection unit, and downloads the data at any past time from the storage service provider (SSP) at a request of the storage service user (SSU).

Therefore, the SSU can be provided with a service as if the user had stored the past data himself or herself. As a result, the cost for managing the storage can be reduced, and the data can be protected against destruction.

(7) When the storage service provider (SSP) stores the data having the same file name as the data uploaded before from the storage service user (SSU), the difference generation unit generates the difference from the past data, and only the difference is stored in the storage service provider (SSP).

Thus, since the amount of data stored in the storage service provider (SSP) can be smaller, the SSP can provide the storage service user (SSU) with a service at a lower cost as if the user had unlimited storage.

Furthermore, the storage service provider (SSP) can collect from the storage service user (SSU) a service rate depending on the amount of accumulated data, or the additional service rate for the management of the version numbers (updated data).

What is claimed is:

1. A storage service method, comprising:

monitoring a storage capacity of a data accumulation unit of a user terminal device; and transferring data of the data accumulation unit to a storage service providing device through a network such that the free capacity of the data accumulation unit cannot be smaller than a predetermined value, where attribute information is used for determining the transfer of the data.

2. The method according to claim 1, wherein:

said user terminal device detects whether or not data is deleted or updated; and when data is deleted or updated, the data before deletion or update is transferred to the storage service providing device.

3. The method according to claim 1, wherein:

a use frequency of data in the user terminal device is determined; and data is sequentially transferred to the storage service providing device in order from lowest use frequency such that the free capacity of the data accumulation unit cannot be smaller than the predetermined value.

4. The method according to claim 1, wherein:

policy information defining a process of data is added to the data; and when said data is transferred from the data accumulation unit to the storage service providing device, the data to be transferred is selected according to the policy information.

5. A storage service method, comprising:

determining whether data is deleted or updated in a user terminal device; transferring the data before deletion or update from the user terminal device to a storage service providing device when the data is deleted or updated; and storing the transferred data in the storage service providing device, where attribute information is used for determining the transfer of the data.

6. A storage service user terminal device, comprising:

a data accumulation unit accumulating data;

a free capacity monitor unit monitoring a free capacity of said data accumulation unit; and a data transfer unit transferring the data of said data accumulation unit to a storage service providing unit through a network such that the free capacity of said data accumulation unit cannot be smaller than a predetermined value based on a monitor result of said free capacity monitor unit, where attribute information is used for determining the transfer of the data.

7. The device according to claim 6, further comprising a detection unit detecting whether or not data is deleted or updated, wherein when said detection unit detects that data is deleted or updated, said data transfer unit transfers the data before deletion or update to said storage service providing device.

8. The device according to claim 6, further comprising a use frequency determination unit determining a use frequency of data accumulated in said data accumulation unit, wherein said data transfer unit sequentially transfers the data in order from lowest use frequency based on a determination result of said use frequency determination unit.

9. The device according to claim 6, wherein:

said data accumulation unit stores data with policy information defining a process of the data added to the data; and when data is transferred from said data accumulation unit to said storage service providing device, data to be transferred is selected according to the policy information.

10. The device according to claim 6, further comprising a data determination unit determining whether or not data to be used has been transferred to the storage service providing device, wherein when said data determination unit determines that the data has been transferred to the storage service providing device, said data transfer unit downloads the data from the storage service providing device.

11. The device according to claim 6, further comprising an update date determination unit determining an update date of data, wherein said data transfer unit selects data of an earlier update date as transfer data.

12. The device according to claim 6, further comprising a relevant data determination unit determining whether or not relevant data exists, wherein when said relevant data determination unit determines that there is relevant data, said data transfer unit simultaneously transfers other data relevant to the data to said storage service providing device.

13. The device according to claim 6, wherein said data transfer unit comprises an upload unit and a download unit respectively uploading the data in said data accumulation unit into said storage service providing device when said free capacity of said data accumulation unit is close to the predetermined value and downloading necessary data from said storage service providing device.

14. A storage service providing device, comprising:

a reception unit receiving data to be uploaded from a user terminal device through a network to reserve a free capacity such that a free capacity of a data accumulation unit of the user terminal device cannot be smaller than a predetermined value;

a data accumulation unit of a storage service providing device storing data;

a data read unit reading data when the user terminal device requests the data to be downloaded; and a transmission unit downloading the data read from said data accumulation unit of the storage service providing device into the user terminal device, where attribute information is used for determining the download of the data.

15. The device according to claim 14, further comprising:

a difference generation unit generating a difference between the data received by said reception unit and past data generated from stored data in said data accumulation unit of the storage service providing device; and data storage unit storing the difference data generated by said difference generation unit in said data accumulation unit.

16. A computer-readable storage medium storing a storage service program comprising computer executable codes used to direct a computer to perform the process comprising:

monitoring a free capacity of a data accumulation unit of a user terminal device; and transferring data in said data accumulation unit to a storage service providing device through a network such that the free capacity of the data accumulation unit cannot be smaller than a predetermined value, where attribute information is used for determining the transfer of the data.

17. The storage medium according to claim 16, the process further comprising:

determining whether or not data is deleted or updated in the user terminal device; and when data is deleted or updated, the data before deletion or update is transferred from the user terminal device to the storage service providing device.

18. A storage service method, comprising:

monitoring a storage capacity of a data accumulation unit of a user terminal device storing user editable data having attribute information; and automatically transferring the user editable data to a storage service providing device through a network when attribute information of the user editable data changes so that the storage capacity of the data accumulation unit is maintained at a predetermined value.

19. A storage service method, comprising:

determining whether data stored in a user terminal device matches policy information and attribute information including format information of the data; and automatically transferring the data to a storage service providing device through a network upon determining that the data stored in the user terminal device matches the policy information and the attribute information.

* * * * *